(12) United States Patent
Fujii et al.

(10) Patent No.: US 9,574,098 B2
(45) Date of Patent: Feb. 21, 2017

(54) INK FOR INKJET RECORDING AND RECORDING METHOD THEREWITH

(71) Applicants: Ichiroh Fujii, Kanagawa (JP); Naohiro Toda, Kanagawa (JP); Tomohiro Nakagawa, Kanagawa (JP); Hidefumi Nagashima, Kanagawa (JP)

(72) Inventors: Ichiroh Fujii, Kanagawa (JP); Naohiro Toda, Kanagawa (JP); Tomohiro Nakagawa, Kanagawa (JP); Hidefumi Nagashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/758,374

(22) PCT Filed: Jan. 27, 2014

(86) PCT No.: PCT/JP2014/052368
§ 371 (c)(1),
(2) Date: Jun. 29, 2015

(87) PCT Pub. No.: WO2014/119771
PCT Pub. Date: Aug. 7, 2014

(65) Prior Publication Data
US 2015/0329731 A1  Nov. 19, 2015

(30) Foreign Application Priority Data

Jan. 29, 2013  (JP) .................................. 2013-014002
Jul. 22, 2013  (JP) .................................. 2013-151331

(51) Int. Cl.
| | | |
|---|---|---|
| *B41J 2/01* | (2006.01) | |
| *C09D 11/322* | (2014.01) | |
| *B41J 2/21* | (2006.01) | |
| *B41J 11/00* | (2006.01) | |
| *C09D 11/102* | (2014.01) | |
| *C09D 11/38* | (2014.01) | |

(52) U.S. Cl.
CPC ............ *C09D 11/322* (2013.01); *B41J 2/2107* (2013.01); *B41J 11/002* (2013.01); *C09D 11/102* (2013.01); *C09D 11/38* (2013.01)

(58) Field of Classification Search
CPC ............. B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC .................................................... 347/95–105
See application file for complete search history.

(56) References Cited

U.S. PATENT DOCUMENTS

| | | | |
|---|---|---|---|
| 8,110,257 B2 | 2/2012 | Nagashima et al. | |
| 8,304,043 B2 | 11/2012 | Nagashima et al. | |
| 8,382,271 B2 | 2/2013 | Goto et al. | |
| 2005/0176847 A1 | 8/2005 | Cagle | |
| 2008/1097005 | 4/2008 | Shiotani | |
| 2008/0276833 A1* | 11/2008 | Sasaki ................. | C09D 11/30 106/31.13 |
| 2008/0282932 A1* | 11/2008 | Kiyomoto ............ | C09D 11/322 106/31.65 |
| 2009/0047431 A1 | 2/2009 | Hatada et al. | |
| 2009/0219330 A1 | 9/2009 | Kiyomoto et al. | |
| 2011/0205288 A1 | 8/2011 | Matsuyama et al. | |
| 2011/0318551 A1 | 12/2011 | Nakagawa | |
| 2012/0098883 A1 | 4/2012 | Matsuyama et al. | |
| 2012/0176455 A1* | 7/2012 | Ohta .................... | B41M 5/0011 347/102 |
| 2012/0188312 A1 | 7/2012 | Nakagawa | |
| 2012/0206534 A1 | 8/2012 | Fassam et al. | |
| 2012/0227619 A1* | 9/2012 | Koganehira ........... | C09D 11/14 106/31.13 |
| 2012/0308785 A1 | 12/2012 | Nakagawa | |
| 2012/0308786 A1 | 12/2012 | Shioda et al. | |
| 2013/0002776 A1 | 1/2013 | Nagashima et al. | |
| 2013/0023614 A1 | 1/2013 | Hatada et al. | |
| 2013/0063524 A1 | 3/2013 | Katoh et al. | |
| 2013/0065028 A1* | 3/2013 | Fujii ..................... | C09D 7/001 347/20 |
| 2013/0197144 A1 | 8/2013 | Katoh et al. | |
| 2013/0271524 A1 | 10/2013 | Katoh et al. | |

FOREIGN PATENT DOCUMENTS

| | | |
|---|---|---|
| CN | 101412865 A | 4/2009 |
| CN | 102002278 A | 4/2011 |

(Continued)

OTHER PUBLICATIONS

Material Safety Data Sheet (MSDS); 2,3-Butanediol; Feb. 28, 2011; SIGMA-ALDRICH; pp. 1-5.*

(Continued)

*Primary Examiner* — Manish S Shah
(74) *Attorney, Agent, or Firm* — Oblon, McClelland, Maier & Neustadt, L.L.P.

(57) ABSTRACT

An ink for inkjet recording, including: water; a water-soluble organic solvent; a pigment; and resin particles, wherein 50% by mass or more of the water-soluble organic solvent is a water-soluble organic solvent having a boiling point of lower than 200° C., and the water-soluble organic solvent having a boiling point of lower than 200° C. comprises 3-methoxy-3-methyl-1-butanol.

16 Claims, No Drawings

(56) References Cited

FOREIGN PATENT DOCUMENTS

| | | |
|---|---|---|
| EP | 1 990 385 A1 | 11/2008 |
| EP | 2 290 023 A1 | 3/2011 |
| JP | 2005-220352 | 8/2005 |
| JP | 2008-303380 | 12/2008 |
| JP | 4317241 | 5/2009 |
| JP | 2011-094082 | 5/2011 |
| JP | 2012-207202 A | 10/2012 |
| JP | 2013-001755 | 1/2013 |
| JP | 2014-159533 | 9/2014 |
| JP | 2014-198824 | 10/2014 |
| RU | 2 342 414 | 12/2008 |
| WO | WO 2011/021052 | 2/2011 |
| WO | WO 2011/040517 A1 | 4/2011 |
| WO | WO 2012124790 A1 * | 9/2012 ............ C09D 11/00 |
| WO | WO2014/119769 A1 | 8/2014 |

OTHER PUBLICATIONS

Material Safety Data Sheet (MSDS); Propylene glycol; May 21, 2013; ScienceLab.com; pp. 1-6.*

SIDS Initial Assessment Report (Material Safety Data Sheet (MSDS)); 3-Methoxy-3-methyl-1-butanol; Apr. 20, 2004-Apr. 23, 2004; SIDS Initial Assessment Report; pp. 1-70.*

International Search Report Issued Apr. 22, 2014 for counterpart International Patent Application No. PCT/JP2014/052368 filed Jan. 27, 2014.

Combined Chinese Office Action and Search Report issued Mar. 21, 2016 in Patent Application No. 201480006466.0 (with English language translation).

Extended European Search Report issued Jan. 25, 2016 in Patent Application No. 14746587.6.

Office Action in corresponding Russian application No. 2015136778, dated Sep. 7, 2016. (w/English translation).

* cited by examiner

INK FOR INKJET RECORDING AND RECORDING METHOD THEREWITH

TECHNICAL FIELD

The present invention relates to an aqueous ink for inkjet recording that is optimal for recording on a non-porous substrate, and an inkjet recording method.

BACKGROUND ART

Inkjet printers have been widely used as digital signal output equipment in general homes because of having advantages such as low noise, low running cost, and easiness of color printing.

In recent years, inkjet techniques have been increasingly utilized not only in such homes but also for industrial applications such as a display, a poster, and a bulletin board.

In such applications, since porous mediums are problematic in terms of durability such as lightfastness, water resistance, and wear resistance, non-porous recording mediums such as a plastic film have been used, and inks therefor have been developed.

As such inks, for example, solvent-based inkjet inks using an organic solvent as a vehicle, and ultraviolet curable inkjet inks including a polymerizable monomer as a main component have been ever used widely.

However, the solvent-based inkjet inks are not preferable in terms of environmental load because the solvent is evaporated in the atmosphere, and the ultraviolet curable inkjet inks have limited application fields because they may have skin sensitizing properties depending on the monomer to be used and an expensive ultraviolet irradiation apparatus is required to be incorporated to the main body of a printer.

In view of such background, there have been recently developed inkjet inks capable of being directly used for printing on a non-porous substrate, which are aqueous inks for inkjet recording which give less environmental load and which have been widely used as inkjet inks for household use. Examples of such attempts can be found in PTL 1 and PTL 2.

However, such aqueous inks generally have several drawbacks pointed out in terms of image quality, as compared with the solvent-based inkjet inks.

First, while the inks must be immediately dried on a non-porous substrate because of not essentially penetrating into the substrate, water itself which is the main solvent of the aqueous ink, and a water-soluble organic solvent added as an additive tend to cause deterioration in drying properties to result in poor drying, and therefore ink show-through, so-called blocking, may occur when printed articles are stacked or rolled up.

In addition, while the non-porous substrate is very glossy in many cases and thus there are demanded for inks which achieve high gloss so that a sense of unity between a printed portion and an unprinted portion as a recorded product is not impaired after printing, particles are fused to form a coating film unlike the case of the solvent-based inks into which a resin is dissolved, and thus the surface is easily roughened and the gloss thereon is easily impaired.

CITATION LIST

Patent Literature

PTL 1: Japanese Patent Application Laid-Open (JP-A) No. 2005-220352

PTL 2: JP-A No. 2011-94082

SUMMARY OF INVENTION

Technical Problem

An object of the present invention is to provide an ink for inkjet recording that is excellent in storage stability and discharge stability thereof with time while having no repellency to a non-porous substrate, having good wettability to exhibit high smoothness and a high gloss level on a printed portion, and having good drying properties, as well as an inkjet recording method.

Solution to Problem

The ink for inkjet recording of the present invention as a measure for solving the above problems contains at least water, a water-soluble organic solvent, a pigment, and resin particles, wherein 50% by mass or more of the water-soluble organic solvent is a water-soluble organic solvent having a boiling point of lower than 200° C., and the water-soluble organic solvent having a boiling point of lower than 200° C. includes 3-methoxy-3-methyl-1-butanol.

Advantageous Effects of Invention

The present invention exerts such an extremely excellent effect that provided are an ink having no repellency to a non-porous substrate, having good wettability to thereby exhibit high smoothness and a high gloss level on a printed, portion, and having good drying properties, and an inkjet recording method. That is, since a water-soluble organic solvent to be added to an ink generally has a higher boiling point than water and is not easily dried, an organic solvent having a relatively low boiling point is required to be added in order to achieve drying properties demanded in the present invention.

However, when quick-drying properties are demanded, film formation by resin particles is generally too fast, and thus no sufficiently uniform coating film can be formed to cause a poor film strength and a low gloss level.

The ink for inkjet recording of the present invention can be used to thereby form a uniform film.

Then, such a present invention provides an ink for inkjet recording that can be used for printing on various non-porous substrates, in particular, a plastic film, that can simultaneously satisfy quick-drying properties and high gloss, that has a high image fastness, and that is excellent in storage stability and discharge stability with time, as well as an inkjet recording method and an inkjet-recorded product using the same.

DESCRIPTION OF EMBODIMENTS

Ink for Inkjet Recording

An aqueous ink for inkjet recording of the present invention contains at least water, a water-soluble organic solvent, a pigment and resin particles, and further contains other components, if necessary.

A water-soluble organic solvent to be added to an aqueous ink generally has a higher boiling point than water and is not easily dried, and thus an organic solvent having a relatively low boiling point is required to be added in order to achieve drying properties demanded in the present invention.

However, when quick-drying properties are demanded, film formation by resin particles is generally too fast, and thus no sufficiently uniform coating film can be formed to cause a poor film strength and a low gloss level.

The present inventors have continuously studied for a relationship between the resin particles and the water-soluble organic solvent present, and as a result, have found that 50% by mass or more of the water-soluble organic solvent is constituted by a water-soluble organic solvent having a boiling point of lower than 200° C. and 3-methoxy-3-methyl-1-butanol is used in the water-soluble organic solvent having a boiling point of lower than 200° C. to form a uniform film, leading to the completion of the present invention.

<Resin Particles>

First, the resin particles for use in the present invention are described. In order to use an ink liquid to obtain a printed article that is quickly recorded and fixed on a non-porous substrate, that exhibits sufficient adhesiveness and durability, and that is for use in such severe environments as outdoor applications, the resin particles are preferably ones capable of forming a film excellent in affinity for a specific hydrophilic solvent (namely, 3-methoxy-3-methyl-1-butanol) and excellent in hardness and toughness after drying.

As the resin particles, in addition to urea-based, melamine-based and phenol-based ones conventionally known, acrylic or PVAc-based (including PVA) emulsion-type ones or the like that can be expected to have hot-melt properties and thus are currently used heavily in the adhesive field or ones made of a modified resin (copolymer) obtained by further introducing a curing reactive group to the emulsion-type ones, or ones made of a urethane-based emulsion are preferably used. The resin particles may be any particles made of a resin material, having a high aggregating force to thereby be excellent in water resistance, heat resistance, wear resistance and weather resistance.

Typically, for example, polycarbonate-based urethane resin particles are suitable for printed articles for use in such severe environments as outdoor applications because of being excellent in water resistance, heat resistance, wear resistance and weather resistance due to the high aggregating force of a carbonate group. Hereinafter, the resin will be mainly described.

The polycarbonate-based urethane resin in the present invention refers to one obtained by reacting a polycarbonate polyol and a polyisocyanate.

As the polycarbonate polyol, for example, one obtained by subjecting a carbonate ester and a polyol to a transesterification reaction in the presence of a catalyst, and one obtained by reacting phosgene and bisphenol A can be used.

As the carbonate ester, for example, methyl carbonate, dimethyl carbonate, ethyl carbonate, diethyl carbonate, cyclocarbonate, and diphenyl carbonate can be used.

As the polyol to be reacted with the carbonate ester, for example, low molecular weight diol compounds such as ethylene glycol, diethylene glycol, 1,2-propylene glycol, dipropylene glycol, 1,4-butanediol, 1,5-pentanediol, 3-methyl-1,5-pentanediol, neopentyl glycol and 1,4-cyclohexanediol, polyethylene glycol, and polypropylene glycol can be used.

The polyisocyanate that can be used in the present invention is not particularly limited, and examples thereof include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis(2-isocyanatoethyl)carbonate and 2-isocyanatoethyl-2,6-diisocyanatohexanoate; and alicyclic polycyanate compounds such as isophorone diisocyanate 4,4'-dicyclohexylmethane diisocyanate (hydrogenated MDI), cyclohexylene diisocyanate, methylcyclohexylene diisocyanate (hydrogenated TDI), bis (2-isocyanatoethyl)-4-cyclohexene-1,2-dicarboxylate, 2,5-norbornane diisocyanate and 2,6-norbornane diisocyanate. These can be used singly or in combinations of two or more.

Since the ink of the present invention is supposed to be used in outdoor applications such as a poster and an advertising display, a coating film having a very high long-term weather resistance is needed, and from this viewpoint an aliphatic or alicyclic diisocyanate is preferably used.

Furthermore, at least one alicyclic diisocyanate is preferably contained in the ink of the present invention. It is effective that the polycarbonate-based urethane resin particles have a structure derived from at least one alicyclic diisocyanate because scratch resistance and ethanol resistance are enhanced. Thus, the surface hardness during formation of the coating film can be 100 $N/mm^2$ or more, and a high scratch resistance is achieved and the objective strength of the coating film is easily achieved.

In particular, isophorone diisocyanate and dicyclohexylmethane diisocyanate can be suitably used, and the proportion of the alicyclic diisocyanate is preferably 60% or more in the entire isocyanate compound.

In the present invention, the polycarbonate-based urethane particles can be added in the form of resin emulsion in which the particles are dispersed in an aqueous medium.

The resin solid content in the resin emulsion is preferably 20% by mass or more, and if the content is less than 20% by mass, it is difficult to design the formulation during formation of the ink, and such content is not preferable. The urethane resin particles here preferably has an average particle size in the range of 10 nm to 350 nm in terms of liquid storage stability and discharge stability during formation of the ink.

In addition, when the urethane particles are dispersed in an aqueous medium, a forced emulsified type emulsion in which a dispersant is utilized can be used, but the dispersant may remain in the coating film to result in the reduction in strength, and thus a so-called self-emulsification type emulsion in which a molecular structure has anionicity can be suitably used. In such a case, an anionic group is preferably contained so that the acid value is 20 mgKOH/g to 100 mgKOH/g, from the viewpoint of imparting excellent scratch resistance and chemical resistance.

As the anionic group, for example, a carboxyl group, a carboxylate group, a sulfonic acid group, and a sulfonate group can be used, and among them, a carboxylate group and a sulfonate group partially or entirely neutralized by a basic compound are preferably used from the viewpoint of maintaining a good water dispersing stability.

Examples of the basic compound usable for neutralizing the anionic group include ammonia, organic amines such as triethylamine, pyridine and morpholine, alkanolamines such as monoethanolamine, and metal base compounds including Na, K, Li, Ca, and the like.

When a forced emulsification method is used, any of a non-ionic surfactant and an anionic surfactant can be used, but a non-ionic surfactant is more preferable because of making water resistance better.

Examples of the non-ionic surfactant include polyoxyethylene alkyl ether, polyoxyethylene alkylene alkyl ether, polyoxyethylene derivatives, polyoxyethylene fatty acid ester, polyoxyethylene polyhydric alcohol fatty acid ester, polyoxyethylene propylene polyol, sorbitan fatty acid ester, polyoxyethylene hydrogenated castor oil, polyoxyalkylene polycyclic phenyl ether, polyoxyethylene alkylamine, alkylalkanolamide, and polyalkylene glycol(meth)acrylate.

Preferable examples thereof include polyoxyethylenealkyl ether, polyoxyethylene fatty acid ester, polyoxyethylene sorbitan fatty acid ester, and polyoxyethylene alkylamine.

Examples of the anionic surfactant include an alkyl sulfate salt, polyoxyethylene alkyl ether sulfate, alkylbenzene sulfonate, α-olefin sulfonate, a methyltaurate salt, sulfosuccinate, ether sulfonate, ether carboxylate, a fatty acid salt, a naphthalenesulfonic acid formaldehyde condensate, an alkylamine salt, a quaternary ammonium salt, alkylbetaine, and alkylamine oxide, and preferable examples thereof include polyoxyethylene alkyl ether sulfate and sulfosuccinate.

The amount of the surfactant added is preferably 0.1% by mass to 30% by mass and more preferably 5% by mass to 20% by mass relative to that of the urethane resin. If the amount exceeds 30% by mass, an excess amount of an emulsifier above the amount required for forming a urethane resin emulsion causes adhering properties and water resistance to be remarkably deteriorated, and when the emulsion is formed into a dry film, a plasticization effect and a bleeding phenomenon are caused and blocking is easily caused, and thus such an amount is not preferable.

In addition, the urethane resin emulsion in the present invention can be blended with a water-soluble organic solvent, a preservative agent, a leveling agent, an antioxidant, a light stabilizer, an ultraviolet absorbing agent, and the like, if necessary.

Then, the method for producing the polycarbonate-based urethane resin particles in the present invention is described.

Any method conventionally commonly used can be used, and examples thereof are as follows.

First, the polycarbonate polyol and the polyisocyanate are reacted without a solvent or in the presence of an organic solvent in such an equivalent ratio that an isocyanate group is excessive, to produce an isocyanate-terminal urethane prepolymer.

Then, the anionic group in the isocyanate-terminal urethane prepolymer is if necessary neutralized by the neutralizing agent and then reacted with a chain extender, and the organic solvent in the system is finally removed, if necessary, to provide the polycarbonate-based urethane resin particles.

Examples of the organic solvent usable here include ketones such as acetone and methyl ethyl ketone, ethers such as tetrahydrofuran and dioxane, acetates such as ethyl acetate and butyl acetate, nitriles such as acetonitrile, and amides such as dimethylformamide, N-methylpyrrolidone and N-ethylpyrrolidone.

These may be used singly or in combinations of two or more.

As the chain extender, polyamine or other active hydrogen atom-containing compound can be used, and as the polyamine, for example, diamines such as ethylenediamine, 1,2-propanediamine, 1,6-hexamethylenediamine, piperazine, 2,5-dimethylpiperazine, isophoronediamine, 4,4'-dicyclohexylmethane diamine and 1,4-cyclohexane diamine, polyamines such as diethylenetriamine, dipropylenetriamine and triethylenetetramine, hydrazines such as hydrazine, N,N'-dimethylhydrazine and 1,6-hexamethylenebishydrazine, and dihydrazides such as succinic acid dihydrazide, adipic acid dihydrazide, glutaric acid dihydrazide, sebacic acid dihydrazide and isophthalic acid dihydrazide can be used.

As the other active hydrogen-containing compound, for example, glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin and sorbitol, phenols such as bisphenol A, 4,4'-dihydroxydiphenyl, 4,4'-dihydroxydiphenyl ether, 4,4'-dihydroxydiphenyl sulfone, hydrogenated bisphenol A and hydroquinone, and water can be singly or in combinations of two or more to such an extent that storage stability of a coating agent in the present invention is not deteriorated.

Since the ink of the present invention is supposed to be used for printing on the non-porous substrate heated, the minimum film formation temperature may not be necessarily equal to or lower than room temperature in order to form a film from the polycarbonate-based urethane resin particles for use in the present invention, but the temperature is required to be at least equal to or lower than a temperature at which heating is performed during printing.

The minimum film formation temperature of the urethane resin emulsion is preferably 0° C. or higher and lower than the heating temperature by 5° C. or higher, and further preferably 25° C. or higher and lower than the heating temperature by 10° C. or higher.

In general, while a lower minimum film formation temperature is better in terms of film formation properties, too low a minimum film formation temperature causes a resin to have a low glass transition point, not providing a sufficient coating film strength.

Herein, the minimum film formation temperature refers to the lowest temperature at which a transparent continuous film is formed when the emulsion is thinly cast on a metal plate made of aluminum or the like and heated, and the emulsion is in the form of white powder in a temperature region less than the minimum film formation temperature.

The surface hardness of the polycarbonate-based urethane resin for use in the present invention is preferably 100 $N/mm^2$ or more, and when such a condition is satisfied, the ink of the present invention can form a tough coating film to achieve a stronger scratch resistance.

The surface hardness in the present invention can be measured by, for example, the following method.

The polycarbonate-based urethane resin emulsion is applied on a glass slide so that the film thickness is 10 μm, and then the resultant is dried at 100° C. for 30 minutes to form a resin film. The resin film can be used to determine the surface hardness as a Martens hardness when the resin film is pressed by a Vickers indenter under a load of 9.8 mN using a surface microhardness tester (FISCHERSCOPE HM2000 manufactured by Fischer Instruments K. K.).

The ink of the present invention may contain a resin other than the polycarbonate-based urethane resin particles, but 50% by mass or more of the resin added to the ink is preferably constituted by the polycarbonate-based urethane resin, and 70% by mass or more thereof is more preferably constituted by the polycarbonate-based urethane resin, in order that the effect of the invention is sufficiently satisfied.

Examples of the resin particles that can be contained, other than the polycarbonate-based urethane resin particles, include acrylic resin particles, polyolefin resin particles, vinyl acetate resin particles, vinyl chloride resin particles, fluororesin particles, polyether-based resin particles, and polyester-based resin particles.

In the ink of the present invention, the resin particles are preferably added in an amount of 0.5% by mass or more and 10% by mass or less, more preferably 1% by mass or more and 8% by mass or less, further preferably 3% by mass or more and 8% by mass or less, in terms of solid content. If the amount added is less than 0.5% by mass, the coating film is not sufficiently formed on a pigment to result in poor image fastness, and if the amount added exceeds 10% by mass, the ink has too high a viscosity and is not easily discharged.

Then, other components of the ink of the present invention are described.

The ink of the present invention includes, as components, at least water, a pigment and a water-soluble organic solvent, and may include other components such as a surfactant, an antiseptic/antifungal agent, an anticorrosive agent, and a pH adjuster, if necessary.

<Pigment>

As the pigment, any of an inorganic pigment and an organic pigment can be used.

As the inorganic pigment, for example, in addition to titanium oxide, iron oxide, calcium carbonate, barium sulfate, aluminum hydroxide, Barium Yellow, Cadmium Red, and Chrome Yellow, carbon black produced by a known method such as a contact method, a furnace method, and a thermal method can be used.

Among them, carbon black (Pigment Black 7) can be particularly preferably used, and examples thereof include carbon blacks available from Cabot Corporation under trademarks Regal®, Black Pearls®, Elftex®, Monarch®, Regal®, Mogul® and Vulcan® (for example, Black Pearls 2000, 1400, 1300, 1100, 1000, 900, 880, 800, 700 and 570, Black Pearls L, Elftex 8, Monarch 1400, 1300, 1100, 1000, 900, 880, 800 and 700, Mogul L, Regal 330, 400 and 660, and Vulcan P), and SENSIJET BlackSDP100 (SENSIENT), SENSIJET BlackSDP1000 (SENSIENT) and SENSIJET BlackSDP2000 (SENSIENT).

Examples of the organic pigment include azo pigments (including azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye-type chelates and acidic dye-type chelates), nitro pigments, nitroso pigments, and aniline black.

Specific examples include C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 128, 139, 150, 151, 155, 153, 180, 183, 185 and 213, C.I. Pigment Orange 5, 13, 16, 17, 36, 43 and 51, C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209 and 219, C.I. Pigment Violet 1 (Rhodamine Lake), 3, 5:1, 16, 19, 23 and 38, C.I. Pigment Blue 1, 2, 15 (Phthalocyanine Blue), 15:1, 15:2, 15:3 (Phthalocyanine Blue), 16, 17:1, 56, 60 and 63; and C.I. Pigment Green 1, 4, 7, 8, 10, 17, 18 and 36.

The method for dispersing the pigment in the ink includes a dispersing method by using a surfactant, a dispersing method by using a dispersible resin, a dispersing method by covering the surface of the pigment with a resin, and a method by introducing a hydrophilic functional group to the surface of the pigment to provide a self-dispersible pigment.

In particular, the self dispersible pigment is preferably used because the increase in viscosity during water evaporation is suppressed, such use is effective for discharge reliability and ink deposition in a maintaining apparatus, and an ink extremely stable even in evaluation of ink storage stability with time is obtained. As the self-dispersible pigment having a hydrophilic functional group, one anionically charged is suitable. Examples of the anionic functional group include —COOM, —$SO_3M$, —$PO_3HM$, —$PO_3M_2$, —$CONM_2$, —$SO_3NM_2$, —NH—$C_6H_4$—COOM, —NH—$C_6H_4$—$SO_3M$, —NH—$C_6H_4$—$PO_3HM$, —NH—$C_6H_4$—$PO_3M_2$, —NH—$C_6H_4$—$CONM_2$, and —NH—$C_6H_4$—$SO_3NM_2$, and examples of the counter ion M include an alkali metal ion and a quaternary ammonium ion, but a quaternary ammonium ion is preferable.

Examples of the quaternary ammonium ion include a tetramethylammonium ion, a tetraethylammonium ion, a tetrapropylammonium ion, a tetrabutylammonium ion, a tetrapentylammonium ion, a benzyltrimethylammonium ion, a benzyltriethylammonium ion, and a tetrahexylammonium ion. Among them, a tetraethylammonium ion, a tetrabutylammonium ion, and benzyltrimethylammonium ion are preferable, and a tetrabutylammonium ion is particularly preferable.

When the self-dispersible pigment having the hydrophilic functional group or quaternary ammonium ion is used, the water content in the ink rich in water is evaporated, and affinity is exhibited even in the resulting ink rich in organic solvent to keep the dispersion of the pigment stable.

The self dispersible pigment is preferably a modified pigment modified by a geminal bis-phosphonic acid group or a geminal bis-phosphonic acid salt group, or both thereof.

While a resin particle-containing ink is easily thickened, the aqueous ink for inkjet recording for recording on a non-porous substrate by an inkjet method of the present invention contains the resin particles in an extremely large amount unlike a conventional pigment ink directed to a porous substrate, and thus more easily causes problems of being thickened due to aggregation of the solid content with time and being not discharged due to drying and solidification thereof on the surface of a nozzle.

However, when the pigment is a modified pigment modified by a geminal bis-phosphonic acid group or a geminal bis-phosphonic acid salt group, or both thereof storage stability and discharge stability of the ink with time are enhanced.

Specifically, an ink in which the modified pigment modified by a geminal bis-phosphonic acid group or a geminal bis-phosphonic acid salt group, or both thereof is used is easily dispersed when being dried once and then absorbs moisture, and therefore, even when printing is stopped for a long period and the water content in the ink in the vicinity of an inkjet head nozzle is evaporated, the ink can be used to easily perform good printing by a simple cleaning operation, without causing clogging. Furthermore, since storage stability with time is high and the increase in viscosity during water evaporation is also suppressed, ink-solidifying properties and the discharge reliability in a head-maintaining apparatus are also very excellent.

Specific examples of the phosphonic acid group or phosphonate group include groups represented by the following formulae (1) to (4).

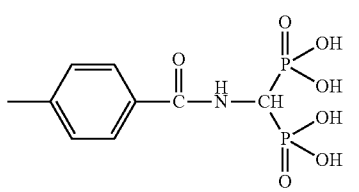

formula (1)

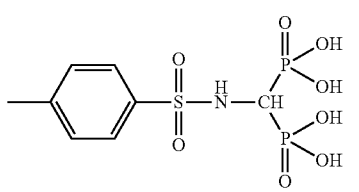

formula (2)

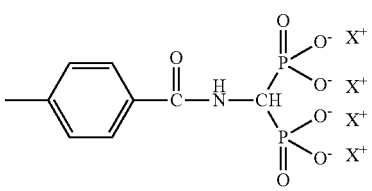

formula (3)

wherein $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

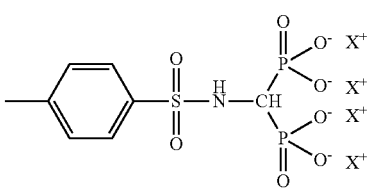

formula (4)

wherein $X^+$ represents $Li^+$, $K^+$, $Na^+$, $N(CH_3)_4^+$, $N(C_2H_5)_4^+$, $N(C_3H_7)_4^+$, or $N(C_4H_9)_4^+$.

<Modification Treatment of Pigment Surface>

Herein, a modification treatment of a pigment surface is described using the case of the geminal bis-phosphonic acid group as an example. Examples of a modification method include the following method A and method B.

(Method A)

Under a room temperature environment, 20 g of carbon black, 20 mmol of a compound represented by the following formula (5) or a compound represented by the following formula (6) and 200 mL of ion-exchange high-purity water are mixed by a Silverson mixer (6,000 rpm).

When the pH of the resulting slurry is higher than 4, 20 mmol of nitric acid is added. After 30 minutes, sodium nitrite (20 mmol) dissolved in a small amount of ion-exchange high-purity water is slowly added to the mixture.

Furthermore, the resultant is warmed to 60° C. for reaction for 1 hour while being stirred, thereby producing a modified pigment in which the compound represented by the following formula (5) or the compound represented by the following formula (6) is added to carbon black.

Then, the pH is adjusted to 10 by an aqueous NaOH solution, thereby providing a modified pigment dispersion after 30 minutes. Then, the dispersion and ion-exchange high-purity water are used to be subjected to dialysis membrane ultrafiltration and also ultrasonic dispersing, thereby providing a modified pigment dispersion in which the solid content is concentrated.

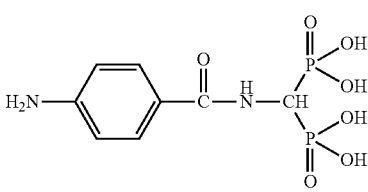

formula (5)

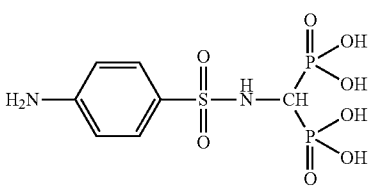

formula (6)

(Method B)

To a ProcessAll 4HV mixer (4 L), 500 g of dry carbon black, 1 L of ion-exchange high-purity water, and 1 mol of the compound represented by the formula (5) or the compound represented by the formula (6) are loaded. Then, the mixture is strongly mixed at 300 rpm for 10 minutes while being warmed to 60° C. An aqueous 20% by mass sodium nitrite solution[1 molar equivalent based on the compound represented by the formula (5) or the compound represented by the formula (6)] is added thereto over 15 minutes, and the resultant is mixed and stirred for 3 hours while being warmed to 60° C.

The reaction product is taken out while being diluted with 750 mL of ion-exchange high-purity water, and the resulting modified pigment dispersion and ion-exchange high-purity water are used to be subjected to dialysis membrane ultrafiltration and also ultrasonic dispersing, thereby providing a modified pigment dispersion in which the solid content is concentrated. Furthermore, when the dispersion contains coarse particles in a large amount, the particles are preferably removed using a centrifugal machine or the like.

A pH adjuster may be added to the modified pigment dispersion obtained as described above, if necessary. As the pH adjuster, the same one as a pH adjuster for inks described later can be used, and in particular, $Na^+$, $N(CH_3)_4^+$, $N(C_2H_5)_4^+$, $N(C_3H_7)_4^+$, and $N(C_4H_9)_4^+$ are preferable.

Then, when the treatment with the pH adjuster is performed, the compound represented by the formula (5) or the formula (6) is at least partially changed to a salt thereof (the group represented by the formula (3) or the group represented by the formula (4)).

The amount of the pigment added as a color material in the ink for inkjet recording is preferably 0.1% by mass or more and 10% by mass or less, more preferably 1% by mass or more and 10% by mass or less, and further preferably 3% by mass or more and 8% by mass or less.

In general, while a higher pigment concentration increases image density to enhance image quality, it increases viscosity to easily cause the adverse effect of easily making discharging difficult.

The pigment preferably has a surface area of 10 $m^2/g$ to 1,500 $m^2/g$, more preferably 20 $m^2/g$ to 600 $m^2/g$, further preferably 50 $m^2/g$ to 300 $m^2/g$.

When the desired surface area is not achieved, the pigment may be subjected to a size reduction or grinding treatment (for example, ball mill grinding or jet mill grinding, or an ultrasonic treatment) so as to have a relatively small particle size.

The volume average particle size) of the pigment in the ink is preferably 10 nm to 200 nm and more preferably 20 nm to 150 nm.

If the volume average particle size exceeds 200 nm, not only pigment-dispersing stability as the ink composition is deteriorated, but also discharge stability is deteriorated and image quality such as image density is also lowered, and thus such a volume average particle size is not preferable. If the volume average particle size is less than 10 nm, storage stability of the ink composition and jetting properties thereof in a printer are stabilized, but the pigment dispersed to such a small particle size makes a dispersing operation and a classifying operation complicated, making it difficult to economically produce a recording liquid.

<Water Soluble Organic Solvent>

The water-soluble organic solvent is constituted by a solvent having a boiling point of lower than 200° C. in an amount of 50% by mass or more thereof and contains 3-methoxy-3-methyl-1-butanol as one component thereof.

Specific examples of the solvent having a boiling point of lower than 200° C. include ethylene glycol (bp: 196° C.), propylene glycol (bp: 188° C.), 1,2-butanediol (bp: 194° C.), 2,3-butanediol (bp: 183° C.), 2-methyl-2,4-pentanediol (bp: 198° C.), dipropylene glycol monomethyl ether (bp: 190° C.), propylene glycol n-butyl ether (bp: 171° C.), propylene glycol t-butyl ether (bp: 153° C.), diethylene glycol methyl ether (bp: 194° C.), ethylene glycol n-propyl ether (bp: 150° C.), and ethylene glycol n-butyl ether (bp: 171° C.).

These may be used singly or in combinations of two or more.

The amount of the organic solvent added to the ink is required to be 50% by mass or more, preferably 70% by mass or more and 80% by mass or less of the total amount of the organic solvent added to the ink. If the amount is less than 50% by mass, drying properties of the ink is inferior, and no sufficient coating film can be formed by the ink to cause blocking.

The water-soluble organic solvent having a boiling point of lower than 200° C. to be used contains 3-methoxy-3-methyl-1-butanol (bp: 174° C.), thereby resulting in the enhancement in gloss of the coating film. The content of the 3-methoxy-3-methyl-1-butanol is preferably 10% by mass or more and 15% by mass or less of the total amount of the organic solvent.

Furthermore, the solvent contains at least any one of propylene glycol and 2,3-butanediol, and such a case is preferable because the solvent is compatible with the polycarbonate-based urethane resin to provide an ink better in film formation properties.

The total content of propylene glycol and 2,3-butanediol is preferably 3% by mass or more and 60% by mass or less of the total amount of the organic solvent.

In addition, for example, in order to allow the ink to have the desired physical properties, in order to prevent the ink from drying, and in order to enhance dissolution stability of the ink, a water-soluble organic solvent other than the water-soluble organic solvent having a boiling point of lower than 200° C. can be added if necessary as long as it satisfies the limitation of the amount added. However, in order to further enhance drying properties, the organic solvent preferably contains no solvent having a boiling point higher than 250° C.

Examples of the other water-soluble organic solvent that can be added in addition to the water-soluble organic solvent having a boiling point of lower than 200° C. include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidinone.

The content of the water-soluble organic solvent, including the organic solvent having a boiling point of lower than 200° C., in the aqueous ink for inkjet recording is preferably 20% by mass or more and less than 70% by mass. If the content is less than 20% by mass, moisture-retaining properties as the ink cannot be sufficiently ensured to cause the deterioration in discharge stability, and if the content exceeds 70% by mass, the ink not only has too high a viscosity but also is inferior in drying properties on a recording medium, and thus printing quality can be low.

<Surfactant>

In the ink of the present invention, a surfactant may be added in order to ensure wettability to a medium. The amount of the surfactant added is preferably 0.1% by mass to 5% by mass as an active component in the ink.

If the amount added is below 0.1% by mass, wettability on the non-porous substrate is not sufficient to cause the degradation in image quality, and if the amount exceeds 5% by mass, the ink easily foams to cause non-discharge. The surfactant that can be used is not particularly limited as long as it satisfies the above limitation.

While any of an amphoteric surfactant, a non-ionic surfactant, and an anionic surfactant can be used, non-ionic surfactants such as polyoxyethylene alkyl phenyl ether, polyoxyethylene alkyl ester, polyoxyethylene alkylamine, polyoxyethylene alkylaniide, a polyoxyethylene propylene block polymer, sorbitan fatty acid ester, polyoxyethylene-sorbitan fatty acid ester and an ethylene oxide adduct of acetylene alcohol are preferably used in terms of a relationship between dispersing stability of the color material and image quality. In addition, a fluorine-based surfactant and a silicone-based surfactant can be used in combination (or singly) depending on formulation.

<Other Additives>

Other additives include an antiseptic/antifungal agent, an anticorrosive agent, and a pH adjuster.

Examples of the antiseptic/antifungal agent include 1,2-benzisothiazolin-3-one, sodium benzoate, sodium dehydroacetate, sodium sorbate, sodium pentachlorophenol, sodium 2-pyridinethiol-1-oxide.

Examples of the anticorrosive agent include acidic sulfite, sodium thiosulfate, ammonium thiodiglycolate, diisopropylammonium nitrite, pentaerythritol tetranitrate, and dicyclohexylammonium nitrite.

As the pH adjuster, any substance can be used as long as it can adjust the pH to the desired value without having any adverse effect on the ink formulated. Examples thereof include hydroxides of alkali metal elements, such as lithium hydroxide, sodium hydroxide and potassium hydroxide, carbonates of alkali metals, such as lithium carbonate, sodium carbonate and potassium carbonate, quaternary ammonium hydroxide, amines such as diethanolamine and triethanolamine, ammonium hydroxide, and quaternary phosphonium hydroxide.

<Production of Ink>

The ink for inkjet recording of the present invention is produced by dispersing or dissolving the components in an aqueous medium, and further stirring and mixing the resultant, if necessary. The stirring and mixing can be performed by a stirrer using a usual stirring blade, a magnetic stirrer, a high-speed disperser, or the like, but the present invention does not depend on the production method.

<Non-Porous Substrate>

When the ink of the present invention is applied on the non-porous substrate, it can provide an image having good gloss and image fastness, and can be suitably used for, in particular, plastic films such as a vinyl chloride resin film, a PET film, and a polycarbonate film, as the non-porous substrate.

<Inkjet Recording Method>

The inkjet recording method of the present invention includes at least a step of heating the non-porous substrate and an ink ejection step, and further includes a heating/drying step and other steps appropriately selected, if necessary.

The heating temperature in the step of heating the non-porous substrate can be changed depending on the type and amount of the water-soluble organic solvent contained in the ink and the minimum film formation temperature of the polycarbonate-based urethane resin emulsion added, and can be further changed depending on the type of a substrate for printing.

The heating temperature is preferably high in terms of drying properties and film formation temperature, but too high a heating temperature is not preferable because the substrate for printing can be damaged and an ink head can also be warmed to thereby cause non-discharge. The heating temperature is generally controlled to 100° C. or lower, but is preferably raised in the range of 40° C. to 80° C.

With respect to such use of a heating apparatus, one or more among many known heating apparatuses can be used. Examples include apparatuses for forced-air heating, radiation heating, conduction heating, high-frequency drying, and microwave drying, and these can be used singly or in combinations of two or more.

While the ink of the present invention can be used for printing a high-quality image on the non-porous substrate, the recording medium is required to be heated during printing in order that the ink forms an image having a higher quality and high scratch resistance and adhesiveness and in order that the ink can address a high-speed printing condition.

The ink ejection step is a step of applying a stimulus to the ink constituting the present invention to thereby allow the ink to be ejected, forming an image.

An ink ejection unit is a unit for applying a stimulus to the ink constituting the present invention to thereby allow the ink to be ejected, forming an image. The ink ejection unit is not particularly limited, and can be appropriately selected depending on the object. Examples thereof include various recording heads (ink discharge heads), and in particular, one having a head having a plurality of nozzle rows and a sub-tank for accommodating a liquid supplied from a tank for liquid storage to supply the liquid to the head is preferable.

The stimulus can be generated by a stimulus-generating unit, the stimulus is not particularly limited and can be appropriately selected depending on the object, and examples thereof include heat (temperature), pressure, vibration, and, light. These may be used singly or in combinations of two or more. Among them, heat and pressure are suitable.

Herein, examples of the stimulus-generating unit include a heating apparatus, a pressurizing apparatus, a piezoelectric element, a vibration-generating apparatus, an ultrasonic wave oscillator, and a light. Specific examples include piezoelectric actuators such as a piezoelectric element, a thermal actuator utilizing a phase transition of liquid due to film boiling using an electrothermal conversion element such as a heat resistor, a shape memory alloy actuator using a metal phase transition due to change in temperature, and a static actuator using an electrostatic force.

The mode of ejection of the ink is not particularly limited and is different depending on the type of the stimulus, and when the stimulus is "heat", examples of the mode include a method in which heat energy corresponding to a recording signal is applied to the ink in a recording head using a thermal head or the like to thereby allow the ink to generate air bubbles, and the pressure of the air bubbles allows the ink to be discharged and jetted as droplets from a nozzle hole of the recording head. In addition, when the stimulus is "pressure", examples of the mode include a method in which a voltage is applied to a piezoelectric element adhered to a position called pressure chamber located in an ink passage in a recording head, to deflect the piezoelectric element and to decrease the volume of the pressure chamber, discharging and jetting the ink as droplets from a nozzle hole of the recording head.

Among them, preferable is the method in which a voltage is applied to a piezo element to allow the ink for recording to be ejected. Since a piezosystem does not generate heat, this is efficient for allowing a resin particle-containing ink to be ejected, and is an effective method that causes less nozzle clogging.

In the inkjet recording method of the present invention, it is preferable that heating and drying be further performed even after printing.

(Ink Cartridge)

The ink cartridge of the present invention includes the ink for inkjet of the present invention and a container, and further includes other members such as an ink bag, if necessary. This makes a direct contact with the ink unnecessary, causes no fear of contamination of hands, fingers and cloths, and can prevent foreign materials such as dusts from being incorporated into the ink, during operations such as ink exchange.

The container is not particularly limited, the shape, structure, size, material and the like thereof can be appropriately selected depending on the object, and for example, one having an ink bag formed by an aluminum laminate film, a resin film, or the like is suitable for the container.

EXAMPLES

Hereinafter, the present invention will be specifically described by Examples. However, these Examples are intended to make the understanding of the present invention easier, and not intended to limit the present invention. In the following each Example, "part(s)" and "%" represent "part(s) by mass" and "% by mass" unless otherwise indicated.

<Preparation of Polycarbonate-Based Urethane Resin Emulsion A>

To a reaction container into which a stirrer, a reflux condenser and a thermometer were inserted were charged 1,500 g of polycarbonate diol (reaction product of 1,6- hexanediol and dimethyl carbonate), 220 g of 2,2-dimethylol propionic acid (DMPA) and 1347 g of N-methylpyrrolidone (NMP) under a nitrogen stream, and heated to 60° C. to dissolve DMPA.

Thereto were added 1,445 g of 4,4'-dicyclohexylmethane diisocyanate and 2.6 g of dibutyl tin dilaurate (catalyst), and heated to 90° C. to perform a urethanization reaction over 5 hours, providing an isocyanate-terminal urethane prepolymer.

The reaction mixture was cooled to 80° C., 149 g of triethylamine was added thereto and mixed, and 4,340 g of the resultant was taken out and added to a mixed solution of 5,400 g of water and 15 g of triethylamine under strong stirring.

Then, 1,500 g of ice was charged thereto, 626 g of an aqueous 35% 2-methyl-1,5-pentanediamine solution was added thereto to perform a chain-extending reaction, and the solvent was distilled off so that the solid content concentration was 30%, providing polycarbonate-based urethane resin emulsion A.

Polycarbonate-based urethane resin emulsion A obtained was applied on a glass slide so that the film thickness was 10 μm, the resultant was dried at 100° C. for 30 minutes to form a resin film, and a Vickers indenter was pressed on the resin film using a microhardness tester (FISCHERSCOPE HM2000, manufactured by Fischer Instruments K. K.) under a load of 9.8 mN and the Martens hardness was here 120 N/mm².

<Preparation of Polycarbonate-Based Urethane Resin Emulsion B>

Polycarbonate-based urethane resin emulsion B having a solid content concentration of 30% by mass was obtained in the same manner except that hexamethylene diisocyanate was used instead of 4,4'-dicyclohexylmethane diisocyanate in the production of polycarbonate-based urethane resin emulsion A.

The coating film strength of polycarbonate-based urethane resin emulsion B obtained was measured in the same manner, and the Martens hardness was 88 N/mm².

<Preparation of Surface-Modified Black Pigment Dispersion>

Under a room temperature environment, 100 g of Black Pearls® 1000 produced by Cabot Corporation (carbon black having a BET specific surface area of 343 m²/g, and having a DBPA of 105 mL/100 g), 100 mmol of a compound of the following formula (5) and 1 L of ion-exchange high-purity water were mixed by a Silverson mixer (6,000 rpm).

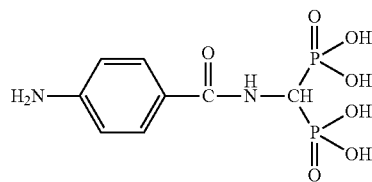

formula (5)

After 30 minutes, sodium nitrite (100 mmol) dissolved in a small amount of ion-exchange high-purity water was slowly added to the resulting mixture.

Furthermore, the resultant was warmed to 60° C. for reaction for 1 hour while being stirred, thereby providing a modified pigment in which a group of the following formula (1) was added to carbon black. Then, the pH is adjusted to 10 by an aqueous NaOH solution, thereby providing a modified pigment dispersion after 30 minutes.

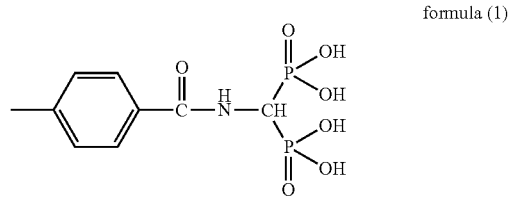 [SMILES: Cc1ccc(C(=O)NC(P(=O)(O)O)P(=O)(O)O)cc1]

formula (1)

This pH adjustment treatment at least partially converts the group represented by the formula (1) to a group in which $X^+$ represented in the following formula (3) is Nat

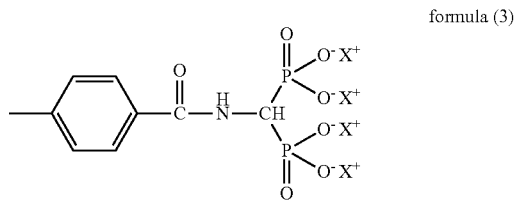

formula (3)

Then, the dispersion and ion-exchange high-purity water were used to be subjected to dialysis membrane ultrafiltration and also ultrasonic dispersing, thereby providing a modified pigment dispersion in which the pigment solid content was concentrated to 20% by mass.

The surface treatment level of the modified pigment is 0.75 mmol/g. In addition, the volume average particle size measured by a particle size distribution measuring apparatus (Nanotrac UPA-EX 150 manufactured by Nikkiso Co., Ltd.) was 120 nm. In addition, the sodium ion content measured by an ion meter IM-32P manufactured by Dkk-Toa Corporation was 27,868 ppm, and the amount of phosphorus (P) by elemental analysis was 2.31%.

<Preparation of Surface-Modified Magenta Pigment Dispersion>

Under a room temperature environment, 100 g of Pigment Red 122 (particle size) produced by Sun Chemical Company Ltd., 50 mmol of a compound represented by the following formula (6) and 1 L of ion-exchange high-purity water were mixed by a Silverson mixer (6,000 rpm).

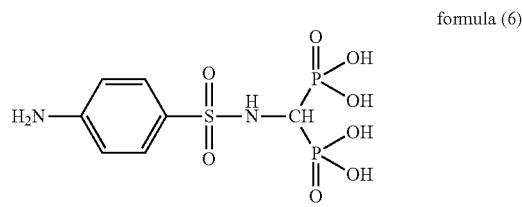 [SMILES: Nc1ccc(S(=O)(=O)NC(P(=O)(O)O)P(=O)(O)O)cc1]

formula (6)

After 30 minutes, sodium nitrite (100 mmol) dissolved in a small amount of ion-exchange high-purity water was slowly added to the resulting mixture.

Furthermore, the resultant was warmed to 60° C. for reaction for 1 hour while being stirred, thereby providing a modified pigment in which a group represented by the following formula (2) was added to Pigment Red 122. Then, the pH is adjusted to 10 by tetramethylammonium hydroxide, thereby providing a modified pigment dispersion after 30 minutes.

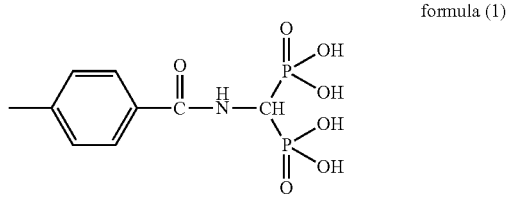 [SMILES: Cc1ccc(C(=O)NC(P(=O)(O)O)P(=O)(O)O)cc1]

formula (1)

This pH adjustment treatment at least partially converts the group represented by the formula (1) to a group in which $X^+$ represented in the following formula (3) is $N(CH_3)_4^+$.

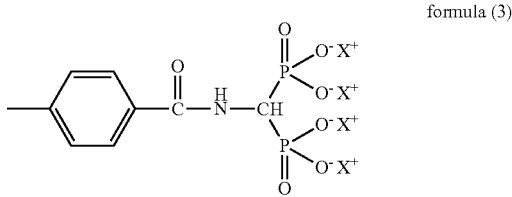

formula (3)

Then, the dispersion and ion-exchange high-purity water were used to be subjected to dialysis membrane ultrafiltration and also ultrasonic dispersing, thereby providing a modified pigment dispersion in which the pigment solid content was concentrated to 20% by mass.

The surface treatment level of the modified pigment was 0.50 mmol/g, the volume average particle size measured by a particle size distribution measuring apparatus (manufactured by Nikkiso Co., Ltd., Nanotrac UPA-EX150) was 113 nm, and the amount of phosphorus (P) by elemental analysis was 0.27%.

<Preparation of Surface-Modified Yellow Pigment Dispersion>

Under a room temperature environment, 690 g of SMART Yellow 3074BA produced by Sensient (Pigment Yellow 74 surface-treated dispersion, pigment solid content: 14.5%), 50 mmol of a compound represented by the following formula (6) and 500 mL of ion-exchange high-purity water were mixed by a Silverson mixer (6,000 rpm).

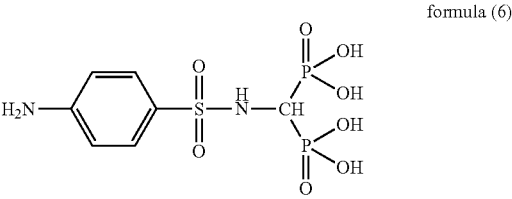 [SMILES: Nc1ccc(S(=O)(=O)NC(P(=O)(O)O)P(=O)(O)O)cc1]

formula (6)

After 30 minutes, sodium nitrite (100 mmol) dissolved in a small amount of ion-exchange high-purity water was slowly added to the resulting mixture.

Furthermore, the resultant was warmed to 60° C. for reaction for 1 hour while being stirred, thereby providing a modified pigment in which a group represented by the following formula (2) was added to Pigment Yellow 74.

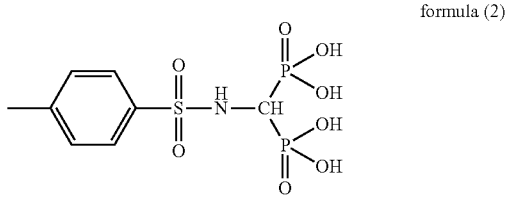 [SMILES: Cc1ccc(S(=O)(=O)NC(P(=O)(O)O)P(=O)(O)O)cc1]

formula (2)

This pH adjustment treatment at least partially converts the group represented by the formula (2) to a group in which $X^+$ represented in the following formula (4) is $N(CH_3)_4^+$.

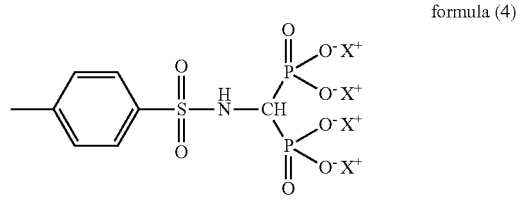

formula (4)

Then, the dispersion and ion-exchange high-purity water were used to be subjected to dialysis membrane ultrafiltration and also ultrasonic dispersing, thereby providing a modified pigment dispersion in which the pigment solid content was concentrated to 20% by mass.

The surface treatment level of the modified pigment is 0.50 mmol/g. In addition, the volume average particle size measured by a particle size distribution measuring apparatus (Nanotrac UPA-EX 150 manufactured by Nikkiso Co., Ltd.) was 111 nm. In addition, the amount of phosphorus (P) by elemental analysis was 0.26%.

<Preparation of Surface-Modified Cyan Pigment Dispersion>

Under a room temperature environment, 690 g of SMART Cyan 3154BA produced by Sensient (Pigment Blue 15:4 surface-treated dispersion, pigment solid content: 14.5%), 50 mmol of a compound of the following formula (5) and 500 mL of ion-exchange high-purity water were mixed by a Silverson mixer (6,000 rpm).

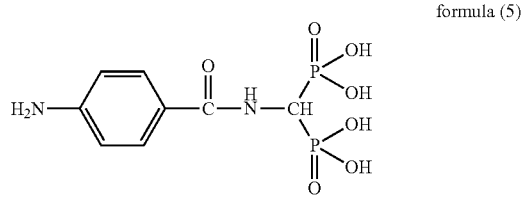

formula (5)

After 30 minutes, sodium nitrite (100 mmol) dissolved in a small amount of ion-exchange high-purity water was slowly added to the resulting mixture. Furthermore, the resultant was warmed to 60° C. for reaction for 1 hour while being stirred, thereby providing a modified pigment in which a group represented by the following formula (1) was added to Pigment Blue 15:4. Then, the pH is adjusted to 10 by tetramethylammonium hydroxide, thereby providing a modified pigment dispersion after 30 minutes.

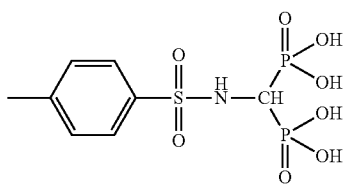

formula (2)

Then, the pH is adjusted to 10 by tetrabutylammonium hydroxide, thereby providing a modified pigment dispersion after 30 minutes. This pH adjustment treatment at least partially converts the group represented by the formula (2) to a group in which $X^+$ represented in the following formula (4) is $N(C_4H_9)_4^+$.

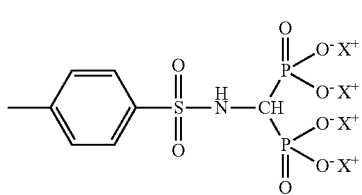

formula (4)

Then, the dispersion and ion-exchange high-purity water were used to be subjected to dialysis membrane ultrafiltration and also ultrasonic dispersing, thereby providing a modified pigment dispersion in which the pigment solid content was concentrated to 20% by mass.

The surface treatment level of the modified pigment is 0.50 mmol/g. In addition, the volume average particle size measured by a particle size distribution measuring apparatus (manufactured by Nikkiso Co., Ltd., Nanotrac UPA-EX150) was 142 nm. In addition, the amount of phosphorus (P) by elemental analysis was 0.26%.

Example 1

The pigment dispersion was used, and mixed and stirred in the following formulation, and thereafter the resultant was subjected to filtration by a 0.2 μm polypropylene filter to produce an ink.
Surface-modified black dispersion (pigment solid content: 20%): 20 parts
Polycarbonate-based urethane resin emulsion A: 15 parts
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 27.9 parts
The ink produced as described above was evaluated by the following method.

Example 2

The pigment dispersion was used, and mixed and stirred in the following formulation, and thereafter the resultant was subjected to filtration by a 0.2 polypropylene filter to produce an ink.
Surface-modified magenta pigment dispersion (pigment solid content: 20%): 20 parts
Polycarbonate-based urethane resin emulsion A: 15 parts
Surfactant $CH_3(CH_2)_{12}O(CH_2CH_2O)_3CH_2COOH$: 2 parts
2,3-Butanediol (bp: 183° C.): 20 parts
3-Methoxy-3-methyl-1-butanol (bp: 174° C.): 5 parts
Ethylene glycol n-hexyl ether (bp: 208° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 3

The pigment dispersion was used, and mixed and stirred in the following formulation, and thereafter the resultant was subjected to filtration by a 0.2 μm polypropylene filter to produce an ink.
Surface-modified cyan pigment dispersion (pigment solid content: 20%): 15 parts
Polycarbonate-based urethane resin emulsion A: 10 parts
Surfactant $CH_3(CH_2)_{12}O(CH_2CH_2O)_3CH_2COOH$: 2 parts
Propylene glycol (bp: 188° C.): 15 parts
1,2-Butanediol (bp: 194° C.): 10 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 32.9 parts
The ink produced as described above was evaluated in the same manner as in Example 1.

Example 4

The pigment dispersion was used, and mixed and stirred in the following formulation, and thereafter the resultant was subjected to filtration by a 0.2 μm polypropylene filter to produce an ink.
Surface-modified yellow pigment dispersion (pigment solid content: 20%): 15 parts
Polycarbonate-based urethane resin emulsion A: 10 parts
Acrylic resin emulsion: 5 parts
(Voncoat R-3380-E produced by Dic Corporation)
Surfactant $CH_3(CH_2)_{12}O(CH_2CH_2O)_3CH_2COOH$: 2 parts
2,3-Butanediol (bp: 183° C.): 25 parts
3-Methoxy-3-methyl-1-butanol (bp: 174° C.): 5 parts
Diethylene glycol n-butyl ether (bp: 230° C.): 10 parts
Antiseptidantifungal agent (Proxel LV produced by Avecia Inc.): 0.1 parts
Ion-exchange water: 27.9 parts
The ink produced as described above was evaluated in the same manner as in Example 1.

Example 5

The pigment dispersion was used, and mixed and stirred in the following formulation, and thereafter the resultant was subjected to filtration by a 0.2 μm polypropylene filter to produce an ink.
Surface-modified black pigment dispersion (pigment solid content: 20%): 20 parts
Polycarbonate-based urethane resin emulsion B: 15 parts
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Diethylene glycol n-butyl ether (bp: 230° C.): 10 parts
Antiseptic/antifungal agent Proxel LV (produced by Avecia Inc.): 0.1 parts Ion-exchange water: 27.9 parts The ink produced as described above was evaluated in the same manner as in Example 1.

Example 6

The pigment dispersion was used, and mixed and stirred in the following formulation, and thereafter the resultant was subjected to filtration by a 0.2 μm polypropylene filter to produce an ink.
Surface-modified magenta pigment dispersion (pigment solid content: 20%): 20 parts
Polycarbonate-based urethane resin emulsion B: 15 parts
Surfactant $CH_3(CH_2)_{12}O(CH_2CH_2O)_3CH_2COOH$: 2 parts
2,3-Butanediol (bp: 183° C.): 15 parts
3-Methoxy-3-methyl-1-butanol (bp: 174° C.): 10 parts
Ethylene glycol n-hexyl ether (bp: 208° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 7

The pigment dispersion was used, and mixed and stirred in the following formulation, and thereafter the resultant was subjected to filtration by a 0.2 μm polypropylene filter to produce an ink.
Surface-modified cyan pigment dispersion (pigment solid content: 20%): 15 parts
Polycarbonate-based urethane resin emulsion A: 10 parts
Surfactant $CH_3(CH_2)_{12}O(CH_2CH_2O)_3CH_2COOH$: 2 parts
1,2-Butanediol (bp: 194° C.): 25 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 32.9 parts
The ink produced as described above was evaluated in the same manner as in Example 1.

Example 8

The pigment dispersion was used, and mixed and stirred in the following formulation, and thereafter the resultant was subjected to filtration by a 0.2 μm polypropylene filter to produce an ink.
Surface-modified yellow pigment dispersion (pigment solid content: 20%): 15 parts
Polycarbonate-based urethane resin emulsion A: 15 parts
Surfactant $CH_3(CH_2)_{12}O(CH_2CH_2O)_3CH_2COOH$: 2 parts
2-methyl-2,4-pentanediol (bp: 198° C.): 25 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 9

The pigment dispersion was used, and mixed and stirred in the following formulation, and thereafter the resultant was subjected to filtration by a 0.2 μm polypropylene filter to produce an ink.
Surface-modified cyan pigment dispersion (pigment solid content: 20%): 20 parts
Polycarbonate-based urethane resin emulsion A: 15 parts
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Tripropylene glycol n-propyl ether (bp: 261° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 10

The pigment dispersion was used, and mixed and stirred in the following formulation, and thereafter the resultant was subjected to filtration by a 0.2 μm polypropylene filter to produce an ink.
Surface-modified yellow pigment dispersion (pigment solid content: 20%): 20 parts
Polycarbonate-based urethane resin emulsion A: 15 parts
Surfactant $CH_3(CH_2)_{12}O(CH_2CH_2O)_3CH_2COOH$: 2 parts
2,3-Butanediol (bp: 183° C.): 20 parts
3-Methoxy-3-methyl-1-butanol (bp: 174° C.): 5 parts
Triethylene glycol (bp: 287° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 11

The pigment dispersion was used, and mixed and stirred in the following formulation, and thereafter the resultant was subjected to filtration by a 0.2 μm polypropylene filter to produce an ink.
Surface-modified black pigment dispersion (pigment solid content: 20%): 20 parts
Polyether-based urethane resin emulsion: 15 parts
(Acrit WBR-016U produced by Taisei Fine Chemical Co., Ltd.)
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 12

The pigment dispersion was used, and mixed and stirred in the following formulation, and thereafter the resultant was subjected to filtration by a 0.2 μm polypropylene filter to produce an ink.
Surface-modified magenta pigment dispersion (pigment solid content: 20%): 20 parts
Polyester-based urethane resin emulsion: 15 parts
(UCOAT UWS-148 produced by Sanyo Chemical Industries, Ltd.)
Surfactant $CH_3(CH_2)_{12}O(CH_2CH_2O)_3CH_2COOH$: 2 parts
2,3-Butanediol (bp: 183° C.): 20 parts
3-Methoxy-3-methyl-1-butanol (bp: 174° C.): 5 parts Ethylene glycol n-hexyl ether (bp: 208° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Example 13

The pigment dispersion was used, and mixed and stirred in the following formulation, and thereafter the resultant was subjected to filtration by a 0.2 μm polypropylene filter to produce an ink.
Surface-modified yellow pigment dispersion (pigment solid content: 20%): 15 parts
Acrylic resin emulsion: 15 parts
(Voncoat R-3380-E produced by Dic Corporation)
Surfactant $CH_3(CH_2)_{12}O(CH_2CH_2O)_3CH_2COOH$: 2 parts
2,3-Butanediol (bp: 183° C.): 25 parts
3-Methoxy-3-methyl-1-butanol (bp: 174° C.): 5 parts
Ethylene glycol n-hexyl ether (bp: 208° C.): 10 parts
Antiseptic/antifungal agent (Proxel LV produced by Avecia Inc.): 0.1 parts
Ion-exchange water: 27.9 parts
The ink produced as described above was evaluated in the same manner as in Example 1.

Comparative Example 1

An ink was produced in the same manner except that the amount of the water-soluble organic solvent having a boiling point of lower than 200° C. in the ink of Example 1 was set to 50% or less of the total of the water-soluble organic solvent.
Surface-modified black pigment dispersion (pigment solid content: 20%): 20 parts
Polycarbonate-based urethane resin emulsion A: 15 parts
Surfactant $CH_3(CH_2)_{12}O(CH_2CH_2O)_3CH_2COOH$: 2 parts
Propylene glycol (bp: 188° C.): 10 parts
3-Methoxy-3-methyl-1-butanol (bp: 174° C.): 5 parts
Diethylene glycol n-butyl ether (bp: 230° C.): 20 parts
Antiseptic/antifungal agent (Proxel LV produced by Avecia Inc.): 0.1 parts
Ion-exchange water: 27.9 parts
The ink produced as described above was evaluated in the same manner as in Example 1.

Comparative Example 2

An ink was produced in the same manner except that resin particles were not added in the ink of Example 2.
Surface-modified magenta pigment dispersion (pigment solid content: 20%): 20 parts
Surfactant $CH_3(CH_2)_{12}O(CH_2CH_2O)_3CH_2COOH$: 2 parts
2,3-Butanediol (bp: 183° C.): 20 parts
3-Methoxy-3-methyl-1-butanol (bp: 174° C.): 5 parts
Ethylene glycol n-hexyl ether (bp: 208° C.): 10 parts
Antiseptic/antifungal agent (Proxel LV produced by Avecia Inc.): 0.1 parts
Ion-exchange water: 42.9 parts
The ink produced as described above was evaluated in the same manner as in Example 1.

Comparative Example 3

An ink was produced in the same manner except that 3-methoxy-3-methyl-1-butanol was not added in the ink of Example 3.

Surface-modified cyan pigment dispersion (pigment solid content: 20%): 15 parts
Polycarbonate-based urethane resin emulsion A: 10 parts
Surfactant $CH_3(CH_2)_{12}O(CH_2CH_2O)_3CH_2COOH$: 2 parts
Propylene glycol (bp: 188° C.): 20 parts
1,2-Butanediol (bp: 194° C.): 10 parts
Diethylene glycol n-butyl ether (bp: 230° C.): 10 parts
Antiseptic/antifungal agent (Proxel LV produced by Avecia Inc.): 0.1 parts
Ion-exchange water: 32.9 parts
The ink produced as described above was evaluated in the same manner as in Example 1.

Example 14

Preparation of Dispersant-Dispersing Black Pigment Dispersion

The following formulation mixture was pre-mixed, and then circulated and dispersed by a disc-type bead mill (Shinmaru Enterprises Corporation, KDL-type, medium: zirconia ball having a diameter of 0.3 mm was used) for 7 hours to provide a pigment dispersion liquid.
Carbon black pigment: 15 parts
Anionic surfactant (Pionin A-51-B produced by Takemoto Oil & Fat Co., Ltd.): 2 parts
Ion-exchange water: 83 parts
The pigment dispersion liquid was used, and mixed and stirred in the following formulation, and thereafter the resultant was subjected to filtration by a 0.2 μm polypropylene filter to produce an ink.
The dispersant-dispersing black pigment dispersion (pigment solid content: 15%): 20 parts
Polycarbonate-based urethane resin emulsion A: 15 parts
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Diethylene glycol n-butyl ether (bp: 230° C.): 10 parts
Antiseptidantifungal agent (Proxel LV produced by Avecia Inc.): 0.1 parts
Ion-exchange water: 27.9 parts
The ink produced as described above was evaluated in the same manner as in Example 1.

Example 15

Preparation of Black Pigment-Containing Polymer Particle Dispersion

—Preparation of Polymer Solution A—
The inside of a 1 L flask equipped with a mechanical stirrer, a thermometer, a nitrogen gas introduction tube, a reflux tube and a dropping funnel was sufficiently replaced with nitrogen gas, and thereafter, 11.2 g of styrene, 2.8 g of acrylic acid, 12.0 g of lauryl methacrylate, 4.0 g of polyethylene glycol methacrylate, 4.0 g of a styrene macromer and 0.4 g of mercaptoethanol were mixed and heated to 65° C. Then, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer, 3.6 g of mercaptoethanol, 2.4 g of azobismethylvaleronitrile and 18 g of methyl ethyl ketone was dropped into the flask over 2.5 hours. After the dropping, a mixed solution of 0.8 g of azobismethylvaleronitrile and 18 g of methyl ethyl ketone was dropped into the flask over 0.5 hours. After aging at 65° C. for 1 hour, 0.8 g of azobismethylvaleronitrile was added thereto and the resultant was further aged for 1 hour. After the completion of reaction, 364 g of methyl ethyl ketone was added into the flask to provide 800 g of polymer solution A having a concentration of 50%.

—Preparation of Pigment-Containing Polymer Particle Dispersion—

After 28 g of polymer solution A, 42 g of carbon black (FW100 produced by Degussa AG), 13.6 g of an aqueous 1 mol/L potassium hydroxide solution, 20 g of methyl ethyl ketone and 13.6 g of ion-exchange water were sufficiently stirred, the resultant was kneaded using a roll mill. The resulting paste was charged to 200 g of pure water, the resultant was sufficiently stirred, and thereafter methyl ethyl ketone and water were distilled off with an evaporator. In order to further remove coarse particles, this dispersion liquid was subjected to pressure filtration by a polyvinylidene fluoride membrane filter having an average pore size of 5.0 µm to provide a carbon black-containing polymer particle dispersion liquid having a pigment solid content of 15% and a solid content concentration of 20%.

The volume average particle size of the polymer particles in the particle dispersion liquid was measured by a particle size distribution measuring apparatus (manufactured by Nikkiso Co., Ltd., Nanotrac UPA-EX150), and it was 104 nm.

The pigment dispersion was used, and mixed and stirred in the following formulation, and thereafter the resultant was subjected to filtration by a 0.2 µm polypropylene filter to produce an ink.

The black pigment-containing polymer particle dispersion (solid content: 20%): 20 parts
Polycarbonate-based urethane resin emulsion A: 15 parts
Surfactant $CH_3(CH_2)_{12}O(CH_2CH_2O)_3CH_2COOH$: 2 parts
Propylene glycol (bp: 188° C.): 20 parts
3-Methoxy-3-methyl-1-butanol (bp: 174° C.): 5 parts
Diethylene glycol n-butyl ether (bp: 230° C.): 10 parts
Antiseptic/antifungal agent (Proxel LV produced by Avecia Inc.): 0.1 parts
Ion-exchange water: 27.9 parts The inks produced as described above were subjected to the following evaluations. The formulation of the inks is shown in Table 1 and Table 2, and the evaluation results are shown in Table 3.

<Evaluation of Repellency>

Each of the inks produced was loaded to an inkjet printer (IPSIO, GXe5500 manufactured Ricoh Company Ltd.). Then, a solid image was printed on a PVC film (IJ5331 manufactured Sumitomo 3M Limited), with a part of the PVC film directly below its inkjet head being heated to 60° C. by a sheet heater from the back surface thereof, and immediately thereafter, the repellency was determined according to the following criteria from the state of a solid portion.

A: Printing is uniformly performed on solid portion.
B: Repellency of a diameter of smaller than 1 mm is observed in solid portion.
C: Repellency of a diameter of larger than 1 mm is observed in solid portion.

<Evaluation of Drying Properties>

Each of the inks produced was loaded to an inkjet printer (IPSIO, GXe5500 manufactured Ricoh Company Ltd.). Then, a solid image was printed on a PVC film (IJ5331 manufactured Sumitomo 3M Limited), with a part of the PVC film directly below its inkjet head being heated to 60° C. by a sheet heater from the back surface thereof, and thereafter further dried at 60° C. for a predetermined time.

Filter paper was pressed on the solid portion after drying, and the degree of the ink transferred to the filter paper was observed to determine the drying properties according to the following criteria.

A: Transfer to filter paper is not observed under drying conditions of 60° C. and less than 15 minutes.
B: Transfer to filter paper is not observed under drying conditions of 60° C. and less than 30 minutes.
C: Transfer to filter paper is not observed under drying conditions of 60° C. and less than 60 minutes.
D: Transfer to filter paper is observed even under drying conditions of 60° C. and 60 minutes.

<Evaluation of Image Gloss Level>

Each of the inks produced was loaded to an inkjet printer (IPSIO, GXe5500 manufactured Ricoh Company Ltd.). Then, a solid image was printed on a PVC film (IJ5331 manufactured Sumitomo 3M Limited), with a part of the PVC film directly below its inkjet head being heated to 60° C. by a sheet heater from the back surface thereof, and thereafter the gloss level at 60° of the solid portion of the image was measured by a gloss level meter (4501 manufactured by BYK Gardener), and determined according to the following criteria.

A: Gloss level at 60° is higher than 100%.
B: Gloss level at 60° is 81% to 100%.
C: Gloss level at 60° is 60% to 80%.
D: Gloss level at 60° is lower than 60%.

<Evaluation of Scratch Resistance>

Each of the inks produced was loaded to an inkjet printer (IPSIO, GXe5500 manufactured Ricoh Company Ltd.). Then, a solid image was printed on a PVC film (IJ5331 manufactured Sumitomo 3M Limited), with a part of the PVC film directly below its inkjet head being heated to 60° C. by a sheet heater from the back surface thereof and thereafter further dried at 80° C. for 1 hour.

A solid portion was scratched by dry cotton (Kanakin #3) under a load of 400 g, and the scratch resistance was determined according to the following criteria.

A: Image is not changed even after being scratched 50 times or more.
B: Some scratch remains at the stage of scratching for 50 times, but has no effect on image density and is not problematic for practical use.
C: Image density is reduced during scratching for 21 to 50 times.
D: Image density is reduced during scratching for 20 times or less.

<Evaluation of Ethanol Resistance>

Each of the inks produced was loaded to an inkjet printer (IPSIO, GXe5500 manufactured Ricoh Company Ltd.) to print a solid image on a PVC film (IJ5331 manufactured Sumitomo 3M Limited), and thereafter further dried at 80° C. for 1 hour.

A cotton applicator was impregnated with an aqueous 50% ethanol solution to scratch the solid portion of an image 20 times, and the degree of scratching of a coating film on the solid portion was observed, and determined according to the following criteria.

A: No scratching is observed on solid portion at all, and also no contamination is observed on cotton applicator.
B: No scratching is observed on solid portion, but slight contamination is adhered on cotton applicator.
C: Melting out of ink is observed on solid portion.
D: Ink on solid portion is scratched and background is partially or more than partially exposed.

<Evaluation of Ink Storage Stability>

Each of the inks produced was loaded to an ink cartridge and stored at 65° C. for 3 weeks, and the thickening and aggregating state thereof was evaluated according to the following criteria.

A: Viscosity change rate before and after storage is within ±5%.

B: Viscosity change rate before and after storage is more than 5% and 10% or less.

C: Viscosity change rate before and after storage is more than 10% and 15% or less.

D: Viscosity change rate before and after storage is more than 15%.

<Evaluation of Discharge Stability>

Each of the inks produced was loaded to an inkjet printer having a covering unit (IPSIO, GXe5500 manufactured Ricoh Company Ltd.) and left to stand at a temperature of 10° C. and at a humidity of 15% RH for 1 week while a head being covered, thereafter a nozzle check pattern was printed, and the presences of non-discharge and jet disturbance were visually observed, and determined according to the following criteria.

A: Neither non-discharge nor jet disturbance is observed at all.

B: Slight jet disturbance is observed.

C: Nozzle in which non-discharge is observed is present.

D: Non-discharge is observed in a plurality of nozzles.

TABLE 1

| Component (% by mass) | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Pigment dispersion | | Surface-treated black pigment dispersion | 20 | — | — | — | 20 | — | — | — | — |
| | | Surface-treated magenta pigment dispersion | — | 20 | — | — | — | 20 | — | — | — |
| | | Surface-treated cyan pigment dispersion | — | — | 15 | — | — | — | 15 | — | 20 |
| | | Surface-treated yellow pigment dispersion | — | — | — | 15 | — | — | — | 15 | — |
| | | Black pigment-containing polymer particle dispersion | — | — | — | — | — | — | — | — | — |
| | | Dispersant-dispersing black pigment dispersion | — | — | — | — | — | — | — | — | — |
| Water-soluble organic solvent | Boiling point of lower than 200° C. | 3-Methoxy-3-methyl-1-butanol (bp 174° C.) | 5 | 5 | 5 | 5 | 5 | 10 | 5 | 5 | 5 |
| | | Propylene glycol (bp 188° C.) | 20 | — | 15 | — | 20 | — | — | — | 20 |
| | | 2,3-Butanediol (bp 183° C.) | — | 20 | — | 25 | — | 15 | — | — | — |
| | | 1,2-Butanediol (bp 194° C.) | — | — | 10 | — | — | — | 25 | — | — |
| | | 2-Methyl-2,4-pentanediol (bp 198° C.) | — | — | — | — | — | — | — | 25 | — |
| | Boiling point of 200° C. or higher and lower than 250° C. | Ethylene glycol n-hexyl ether (bp 208° C.) | — | 10 | — | — | — | 10 | — | — | — |
| | | Diethylene glycol n-butyl ether (bp 230° C.) | 10 | — | 10 | 10 | 10 | — | 10 | 10 | — |
| | Boiling point of higher than 250° C. | Tripropylene glycol n-propyl ether (bp 261° C.) | — | — | — | — | — | — | — | — | 10 |
| | | Triethylene glycol (bp 287° C.) | — | — | — | — | — | — | — | — | — |
| Resin particle | | Polycarbonate-based urethane resin emulsion A | 15 | 15 | 10 | 10 | — | — | 10 | 15 | 15 |
| | | Polycarbonate-based urethane resin emulsion B | — | — | — | — | 15 | 15 | — | — | — |
| | | Acrylic resin emulsion (Voncoat R-3380-E produced by Dic Corporation) | — | — | — | 5 | — | — | — | — | — |
| | | Polyether-based urethane resin emulsion (Acrit WBR-016U produced by Taisei Fine Chemical Co,. Ltd.) | — | — | — | — | — | — | — | — | — |
| | | Polyester-based urethane resin emulsion (UCOAT UWS-148 produced by Sanyo Chemical Industries, Ltd.) | — | — | — | — | — | — | — | — | — |
| Surfactant | | $CH_3(CH_2)_{12}O(CH_2CH_2O)_3CH_2COOH$ | 2 | 2 | 2 | 2 | 2 | 2 | 2 | 2 | 2 |
| Antifungal agent | | Proxel LV | 0.1 | 0.1 | 0.1 | 0.1 | 0.1 | 0.1 | 0.1 | 0.1 | 0.1 |
| Pure water | | | Balance | Balance | Balance | Balance | Balance | Balance | Balance | Balance | Balance |
| Total (% by mass) | | | 100 | 100 | 100 | 100 | 100 | 100 | 100 | 100 | 100 |

TABLE 2

| Component (% by mass) | | Ex. 10 | Ex. 11 | Ex. 12 | Ex. 13 | Comp. Ex. 1 | Comp. Ex. 2 | Comp. Ex. 3 | Ex. 14 | Ex. 15 |
|---|---|---|---|---|---|---|---|---|---|---|
| Pigment dispersion | Surface-treated black pigment dispersion | — | 20 | — | — | 20 | — | — | — | — |
| | Surface-treated magenta pigment dispersion | — | — | 20 | — | — | 20 | — | — | — |

TABLE 2-continued

| Component (% by mass) | | | Ex. 10 | Ex. 11 | Ex. 12 | Ex. 13 | Comp. Ex. 1 | Comp. Ex. 2 | Comp. Ex. 3 | Ex. 14 | Ex. 15 |
|---|---|---|---|---|---|---|---|---|---|---|---|
| | | Surface-treated cyan pigment dispersion | — | — | — | — | — | — | 15 | — | — |
| | | Surface-treated yellow pigment dispersion | 20 | — | — | 15 | — | — | — | — | — |
| | | Black pigment-containing polymer particle dispersion | — | — | — | — | — | — | — | 20 | — |
| | | Dispersant-dispersing black pigment dispersion | — | — | — | — | — | — | — | — | 20 |
| Water-soluble organic solvent | Boiling point of lower than 200° C. | 3-Methoxy-3-methyl-1-butanol (bp 174° C.) | 5 | 5 | 5 | 5 | 5 | 5 | — | 5 | 5 |
| | | Propylene glycol (bp 188° C.) | — | 20 | — | — | 10 | — | 20 | 20 | 20 |
| | | 2,3-Butanediol (bp 183° C.) | 20 | — | 20 | 25 | — | 20 | — | — | — |
| | | 1,2-Butanediol (bp 194° C.) | — | — | — | — | — | — | 10 | — | — |
| | | 2-Methyl-2,4-pentanediol (bp 198° C.) | — | — | — | — | — | — | — | — | — |
| | Boiling point of 200° C. or higher and lower than 250° C. | Ethylene glycol n-hexyl ether (bp 208° C.) | — | — | 10 | 10 | — | 10 | — | — | — |
| | | Diethylene glycol n-butyl ether (bp 230° C.) | — | 10 | — | — | 20 | — | 10 | 10 | 10 |
| | Boiling point of higher than 250° C. | Tripropylene glycol n-propyl ether (bp 261° C.) | — | — | — | — | — | — | — | — | — |
| | | Triethylene glycol (bp 287° C.) | 10 | — | — | — | — | — | — | — | — |
| Resin particle | | Polycarbonate-based urethane resin emulsion A | 15 | — | — | — | 15 | — | 10 | 15 | 15 |
| | | Polycarbonate-based urethane resin emulsion B | — | — | — | — | — | — | — | — | — |
| | | Acrylic resin emulsion (Voncoat R-3380-E produced by Dic Corporation) | — | — | — | 15 | — | — | — | — | — |
| | | Polyether-based urethane resin emulsion (Acrit WBR-016U produced by Taisei Fine Chemical Co,. Ltd.) | — | 15 | — | — | — | — | — | — | — |
| | | Polyester-based urethane resin emulsion (UCOAT UWS-148 produced by Sanyo Chemical Industries, Ltd.) | — | — | 15 | — | — | — | — | — | — |
| Surfactant | | $CH_3(CH_2)_{12}O(CH_2CH_2O)_3CH_2COOH$ | 2 | 2 | 2 | 2 | 2 | 2 | 2 | 2 | 2 |
| Antifungal agent | | Proxel LV | 0.1 | 0.1 | 0.1 | 0.1 | 0.1 | 0.1 | 0.1 | 0.1 | 0.1 |
| Pure water | | | Balance | Balance | Balance | Balance | Balance | Balance | Balance | Balance | Balance |
| Total (% by mass) | | | 100 | 100 | 100 | 100 | 100 | 100 | 100 | 100 | 100 |

TABLE 3

| | Evaluation results | | | | | | |
|---|---|---|---|---|---|---|---|
| | Repellency | Drying properties | Image gloss level | Scratch resistance | Ethanol resistance | Ink storage stability | Discharge stability |
| Example 1 | A | A | A | A | A | A | A |
| Example 2 | A | A | A | A | A | A | A |
| Example 3 | A | A | A | A | A | A | A |
| Example 4 | A | A | A | A | A | A | A |
| Example 5 | A | A | A | A | A | A | A |
| Example 6 | A | A | A | A | A | A | A |
| Example 7 | A | A | B | B | A | A | A |
| Example 8 | A | A | B | B | A | A | A |
| Example 9 | A | B | A | B | A | A | A |
| Example 10 | A | B | A | B | A | A | A |
| Example 11 | A | B | B | B | B | A | A |
| Example 12 | A | B | B | B | B | A | A |
| Example 13 | A | B | B | B | B | A | A |
| Comparative Example 1 | B | D | C | B | A | A | B |
| Comparative Example 2 | B | C | D | D | D | B | A |
| Comparative Example 3 | C | B | C | B | B | A | B |
| Example 14 | A | A | A | A | A | C | C |
| Example 15 | A | A | A | A | A | C | C |

Examples 1 and 2 are found to be better in scratch resistance and ethanol resistance than Examples 11 and 12 in that the condition "the resin particles are polycarbonate-based urethane resin particles having a structure derived from at least one alicyclic diisocyanate" is further satisfied at the same time, and to be better in drying properties than Examples 9 and 10 in that the condition of no high boiling solvent having a boiling point of higher than 250° C. contained as the water-soluble organic solvent is also satisfied at the same time. Furthermore, it is understood that Examples 1 and 2 produce better results in terms of gloss and image fastness than Examples 11 to 13 by using the polycarbonate-based urethane resin as the resin particles.

In addition, it is understood that Examples 3 and 4 are slightly better in gloss properties and scratch resistance than Examples 7 and 8 in which at least one of propylene glycol and 2,3-butanediol is not contained as the water-soluble organic solvent having a boiling point of lower than 200° C.

On the contrary, Comparative Example 1 is an example in which the provision with respect to the solvent of claim 1 is not satisfied, and drying properties that cannot withstand practical use result.

Comparative Example 2 is an example of an ink containing no resin, and the ink can be dried, but has a pigment merely located on a substrate, and thus hardly has gloss and hardly achieves image fastness.

Comparative Example 3 is an example in which 3-methoxy-3-methyl-1-butanol is not contained, and thus repellency was caused, smoothness was not achieved and gloss was inferior.

Examples 14 and 15 are each an example in which a pigment modified by a geminal bis-phosphonic acid group or a geminal bis-phosphonic acid salt group, or both thereof is not used, and there is no problem in terms of drying and image fastness, but sufficient ink storage stability and discharge stability are not achieved.

Aspects of the present invention are as follows, for example.

<1> An ink for inkjet recording, including:
water;
a water-soluble organic solvent;
a pigment; and
resin particles,
wherein 50% by mass or more of the water-soluble organic solvent is a water-soluble organic solvent having a boiling point of lower than 200° C., and the water-soluble organic solvent having a boiling point of lower than 200° C. includes 3-methoxy-3-methyl-1-butanol.

<2> The ink for inkjet recording according to <1>, wherein the ink is used in recording on a non-porous substrate heated, by an inkjet method.

<3> The ink for inkjet recording according to <1> or <2>, wherein the water-soluble organic solvent having a boiling point of lower than 200° C. contains propylene glycol or 2,3-butanediol, or both thereof.

<4> The ink for inkjet recording according to any one of <1> to <3>, wherein the water-soluble organic solvent is free of a water-soluble organic solvent having a boiling point of higher than 250° C.

<5> The ink for inkjet recording according to any one of <1> to <4>, wherein the resin particles are polycarbonate-based urethane resin particles.

<6> The ink for inkjet recording according to <5>, wherein the polycarbonate-based urethane resin particles have a structure derived from at least one alicyclic diisocyanate.

<7> The ink for inkjet recording according to any one of <1> to <6>, wherein the pigment is a modified pigment modified by a geminal bis-phosphonic acid group or a geminal bis-phosphonic acid salt group, or both thereof.

<8> The ink for inkjet recording according to <7>, wherein the modified pigment is one modified by at least one group selected from groups represented by the following formulae (1) to (4).

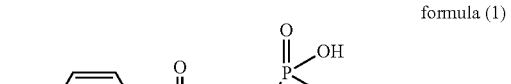

formula (1)

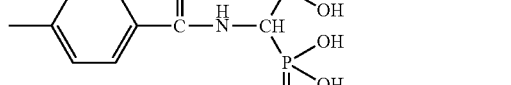

formula (2)

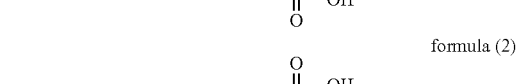

formula (3)

wherein $X^+$ represents $Li^+$, $K^+$, $Na^+$, $NH_4^+$, $N(CH_3)_4^+$, $N(C_2H_5)_4^+$, $N(C_3HO_4^+)$, or $N(C_4H_9)_4^+$;

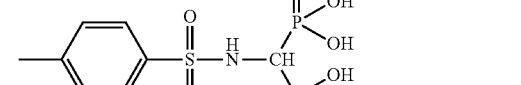

formula (4)

wherein $X^+$ represents $Li^+$, $K^+$, $Na^+$, $NH_4^+$, $N(CH_3)_4^+$, $N(C_2H_5)_4^+$, $N(C_3HO_4^+)$, or $N(C_4H_9)_4^+$.

<9> An inkjet recording method, including:
heating a non-porous substrate; and
allowing an ink to be ejected on the non-porous substrate for printing,
wherein the ink is the ink for inkjet recording according to any one of <1> to <8>.

<10> An ink cartridge, including:
a container; and
the ink for inkjet recording according to any one of <1> to <8>, which is housed in the container.

The invention claimed is:
1. An ink, comprising:
water;
a water-soluble organic solvent;
a pigment; and
resin particles,
wherein 50% by mass or more of the water-soluble organic solvent is a water-soluble organic solvent having a boiling point of lower than 200° C., the water-soluble organic solvent having a boiling point of lower than 200° C. comprises 3-methoxy-3-methyl-1-butanol, and wherein 50% by mass or more of the resin particles is composed of a polycarbonate-based urethane resin.

2. The ink according to claim 1, wherein the ink is applied on a non-porous substrate heated, by an inkjet method.

3. The ink according to claim 1, wherein the water-soluble organic solvent having a boiling point of lower than 200° C. comprises propylene glycol or 2,3-butanediol, or both thereof.

4. The ink according to claim 1, wherein the water-soluble organic solvent is free of a water-soluble organic solvent having a boiling point of higher than 250° C.

5. The ink according to claim 1, wherein the resin particles are polycarbonate-based urethane resin particles.

6. The ink according to claim 5, wherein the polycarbonate-based urethane resin particles have a structure derived from at least one alicyclic diisocyanate.

7. The ink according to claim 1, wherein the pigment is a modified pigment modified by a geminal bis-phosphoric acid group or a geminal bis-phosphonic acid salt group, or both thereof.

8. The ink according to claim 7, wherein the modified pigment is one modified by at least one group selected from groups represented by the following formulae (1) to (4):

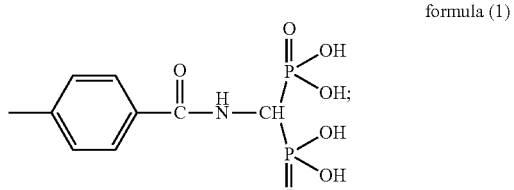

formula (1)

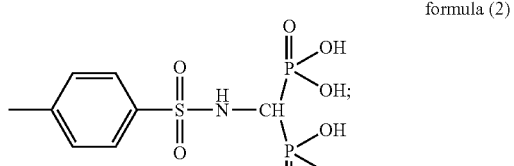

formula (2)

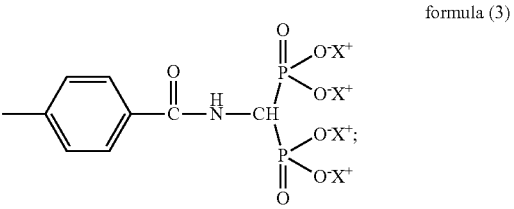

formula (3)

and

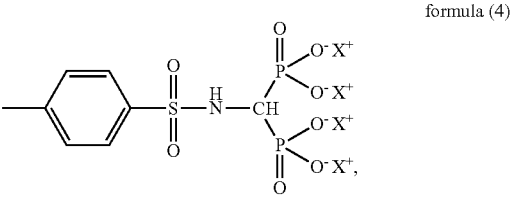

formula (4)

wherein $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

9. The ink according to claim 1, wherein the organic solvent comprises 10% by mass to 15% by mass of the 3-methoxy-3-methyl-1-butanol.

10. The ink according to claim 1, wherein the ink contains 0.5% by mass to 10% by mass of the resin particles in terms of solid content.

11. An inkjet recording method, comprising:
heating a non-porous substrate; and
allowing an ink to be ejected on the non-porous substrate for printing,
wherein the ink comprises:
water;
a water-soluble organic solvent;
a pigment; and
resin particles,
wherein 50% by mass or more of the water-soluble organic solvent is a water-soluble organic solvent having a boiling point of lower than 200° C., and the water-soluble organic solvent having a boiling point of lower than 200° C. comprises 3-methoxy-3-methyl-1-butanol, and
wherein 50% by mass or more of the resin particles is composed of a polycarbonate-based urethane resin.

12. The inkjet recording method of claim 11, wherein the organic solvent comprises 10% by mass to 15% by mass of the 3-methoxy-3-methyl-1-butanol.

13. The inkjet recording method of claim 11, wherein the ink contains 0.5% by mass to 10% by mass of the resin particles in terms of solid content.

14. An ink cartridge, comprising:
a container; and
an ink, which is housed in the container,
wherein the ink comprises:
water;
a water-soluble organic solvent;
a pigment; and
resin particles, and
wherein
50% by mass or more of the water-soluble organic solvent is a water-soluble organic solvent having a boiling point of lower than 200° C.,
the water-soluble organic solvent having a boiling point of lower than 200° C. comprises 3-methoxy-3-methyl-1-butanol, and
wherein 50% by mass or more of the resin particles is composed of a polycarbonate-based urethane resin.

15. The ink cartridge of claim 14, wherein the organic solvent comprises 10% by mass to 15% by mass of the 3-methoxy-3-methyl-1-butanol.

16. The ink cartridge of claim 14, wherein the ink contains 0.5% by mass to 10% by mass of the resin particles in terms of solid content.

* * * * *